United States Patent [19]
Yu

[11] Patent Number: 5,210,609
[45] Date of Patent: May 11, 1993

[54] NOISE REDUCTION CIRCUIT FOR HIGH DEFINITION VIDEO SIGNAL

[75] Inventor: Phil H. Yu, Suweon, Rep. of Korea

[73] Assignee: SamSung Electronics Co., Ltd., Suwon, Rep. of Korea

[21] Appl. No.: 721,947

[22] Filed: Jun. 27, 1991

[30] Foreign Application Priority Data

Jun. 30, 1990 [KR] Rep. of Korea ............... 90-9875

[51] Int. Cl.$^5$ .................... H04N 7/14; H04N 5/04
[52] U.S. Cl. ........................ 358/167; 358/36; 358/133
[58] Field of Search ............ 358/141, 167, 36, 133, 358/166, 37

[56] References Cited

U.S. PATENT DOCUMENTS

| | | | |
|---|---|---|---|
| 4,191,968 | 3/1980 | Kirk, Jr. | 358/141 |
| 4,318,126 | 3/1982 | Sassler | 358/141 |
| 5,016,100 | 5/1991 | Citta et al. | 358/141 |
| 5,016,104 | 5/1991 | Lim | 358/167 |

Primary Examiner—James J. Groody
Assistant Examiner—Glenton B. Burgess
Attorney, Agent, or Firm—Robert E. Bushnell

[57] ABSTRACT

In ATV (Advanced Television) system which compresses the band of high-definition video signal by using sub-band coding method, the high frequency components of the high-definition video signal are divided into two-dimensional blocks by a maximum value detector, and the adaptive block coefficients are generated according to the maximum value of each block by an adaptive block factor generator and are multiplied by each pixel signals to amplify the transmitting level.

Next, in a receiver circuit, the transmitted pixel signals of the high-definition video signal are again divided by the adaptive pixel coefficients, there by reducing the noise mixed during the channel transmission by a factor of the factor ratio.

27 Claims, 6 Drawing Sheets

NOISE REDUCTION CIRCUIT FOR HIGH DEFINITION VIDEO SIGNAL

The present invention relates to a high definition television (HDTV), and more particularly to, a noise reduction circuit for high definition video signals, wherein channel noise mixed during the data transmission is reduced in an advanced television(ATV) system which compresses the band of the high definition video signal by using the a sub-band coding method.

In the noise reduction circuit, after the high frequency components of the high definition video signal are divided into predetermined two-dimensional blocks, adaptive coefficients are generated according to the maximum value of each block and are multiplied by pixels to enhance the level for the channel transmission.

In a receiver, the transmitted level is divided by the adaptive coefficients to reduce the channel noise mixed during the channel transmission by the factor ratio.

Presently, many systems have been proposed for the ATV system in U.S.A. A representative method is the sub-band coding technique proposed by MIT (Massachusetts Institute of Technology) and Zenith Co., in which a video signal is divided into many sub-bands having different frequency characteristics.

The subbands are generally divided into low-frequency bands including a DC component and high-frequency bands, and generally the power and level width of the high-frequency components are lower than those of the low-frequency components.

When the band of the high definition video signal is compressed and transmitted by the sub-band coding method, a mixed signal of the high definition video signal and the noise such as the intermediate electric wave enter the receiver. In the receiver, therefore, the decoding from the transmitted data to the original data is very difficult.

SUMMARY OF THE INVENTION

The present invention has been made in consideration of this and has an object of, and providing a noise reduction circuit for high definition video signal in the ATV system employing the sub-band coding method, in which the adaptive coefficients are generated according to the maximum value of each block and are multiplied by the pixels to increase the encoded signal level for the channel transmission after dividing the high-frequency components of the high-definition video signal into the two-dimensional blocks, and in the receiver the transmitted signal is again divided by the adaptive coefficients to reduce the mixed noise by the factor ratio.

According to the present invention, there is provided a noise reduction circuit comprising:

An absolute value circuit into which a high-frequency video signal is input through an input terminal, and which outputs an absolute value of the high-frequency video signal, a maximum value detecting circuit connected to the absolute value circuit, which extracts the video signal as a predetermined vertical-horizontal two-dimension block, compares the magnitudes of each pixel of the extracted block, and outputs the maximum value for each blocks, a block adaptation factor generating circuit connected to the maximum value detecting circuit and is provided with the maximum value for each block, in order to output a channel peak value as a block adaptive factor if the maximum value of the block is zero or to output a channel peak value which is divided by the maximum value of the block as the block adaptive factor if the maximum value of the block is not zero and transmit it through a channel, a first pixel adaptation factor generating circuit provided with the block adaptation factor, which outputs the pixel adaptive factor to be multiplied by the pixels of the block by interpolation in the horizontal direction and by taking average between lines in the vertical direction, a first delay compensating circuit which delays high frequency component of pixel inputted through input terminal for a predetermined time to synchronize with the timing of the pixel adaptation factor signal, a multiplier which is connected to the output terminals of pixel adaptation factor generating circuit and to the first delay compensating circuit; it and multiplies the delayed pixel signals by the pixel adaptive coefficients to amplify the level of the video signal for transmitting the amplified video signal through a channel, a second pixel adaptation factor generating circuit provided to the transmitted block adaptive factor and generate the pixel adaptive coefficients by interpolation in the horizontal direction and by taking average between lines in the vertical direction, a second delay compensating circuit which delays the transmitted pixel of the high frequency component video signal to be synchronized with the timing of the generated pixel adaptation factor signal from the second pixel adaptation factor generating circuit, and a divider which is connected to both the output terminals of the second pixel adaptation factor generating circuit and the second delay compensating circuit, for reconstructing the high-frequency component video signal by dividing the delayed pixel by the pixel adaptive factor.

BRIEF DESCRIPTION OF THE DRAWINGS

The present invention will be now described in more detail with reference to the accompanying drawings, in which.

DETAILED DESCRIPTION OF THE INVENTION

The present invention will now be described in more detail with reference to accompanying drawing.

Figure 1:
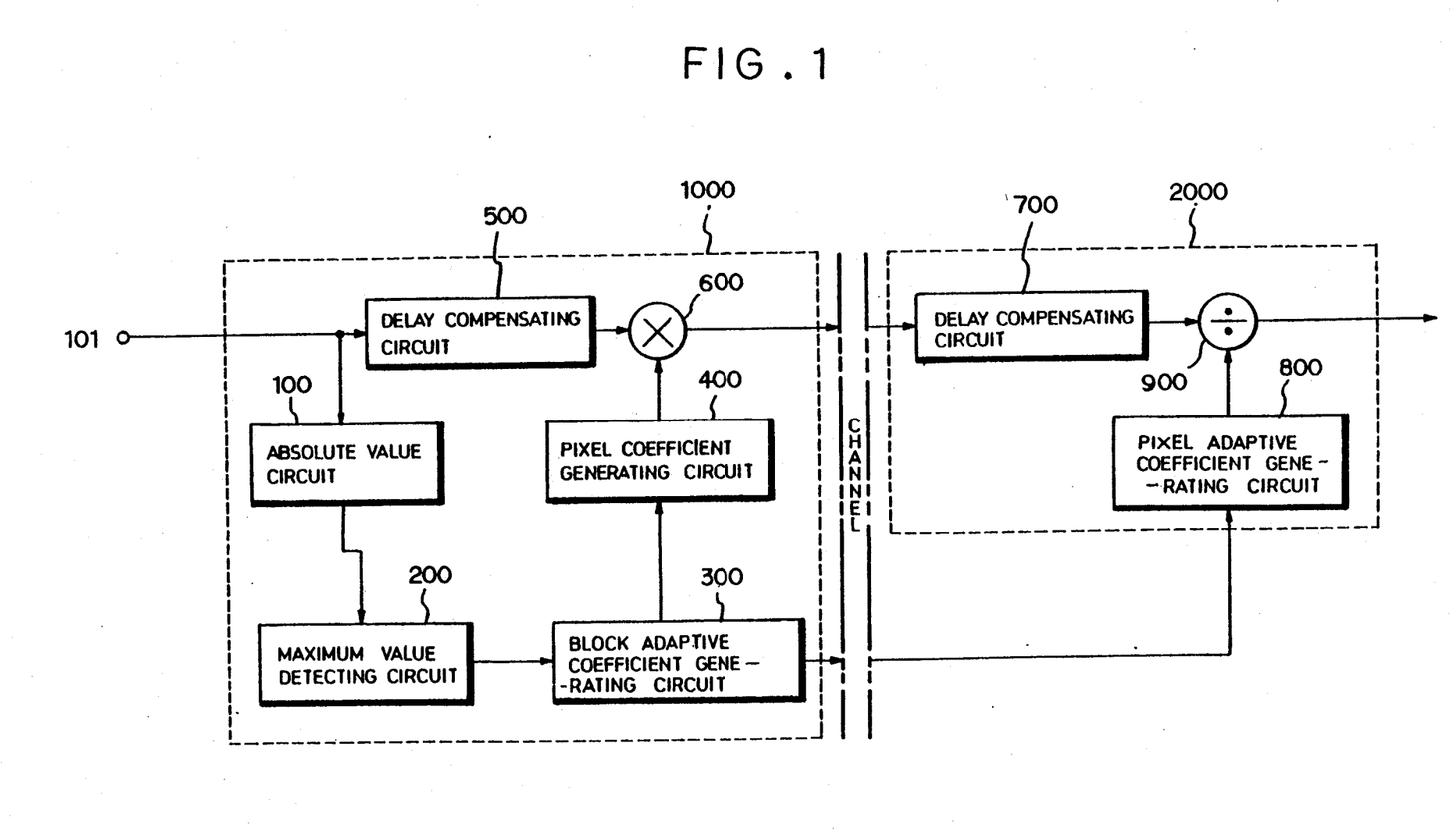
FIG. 1 is a noise reduction circuit for high-definition video signal according to the present invention.

FIG. 1 is a noise reduction circuit for high definition video signal. In an encoder 1000, an absolute value circuit 100 for receiving the high-frequency component video signal through an input terminal 101 and for providing its absolute value is connected to a maximum value detecting circuit 200 for extracting the vertical-horizontal two-dimension block data from the absolute-valued video signal and for providing the maximum value of the blocks by comparing the magnitudes of pixels in the extracted block.

A block adaptation factor generating circuit 300 provides a channel peak value as a block adaptation factor if the maximum value of the block is zero, while the block adaptive factor generating circuit 300 provides the channel peak value divided by the maximum value of the block as the block adaptation factor if the maximum value of the block is not zero. The output of the block adaptation factor 300 is not only provided to a pixel adaptation factor generating circuit 400 but also transmitted through the channel.

The pixel adaptation factor generating circuit 400 receives the block adaptation factor and then provides it by interpolation of the block factor in the horizontal direction and by taking average between lines in the vertical direction so as to multiply the pixels of each block by the pixel adaptive coefficients.

Also, a delay compensation circuit 500 for delaying the high-frequency component video signal to synchronize it with the timing of the pixel factor signal and the pixel adaptive factor generating circuit 400 are connected to a multiplier 600 to amplify the level of the video signal and to transmit the amplified video signal through the channel.

On the other hand, a decoder 2000 for decoding the transmitted video signal is composed of a pixel adaptation factor generation circuit 800, which receives the transmitted block adaptation factor and then provides the pixel adaptive coefficients in the same manner as the pixel adaptation factor generating circuit 400 in the encoder 1000, a delay compensating circuit 700, and a divider 900, which divides the delayed pixel signals of the video signal by the pixel adaptive coefficients, to reconstruct the original high frequency video signal.

Figure 2:
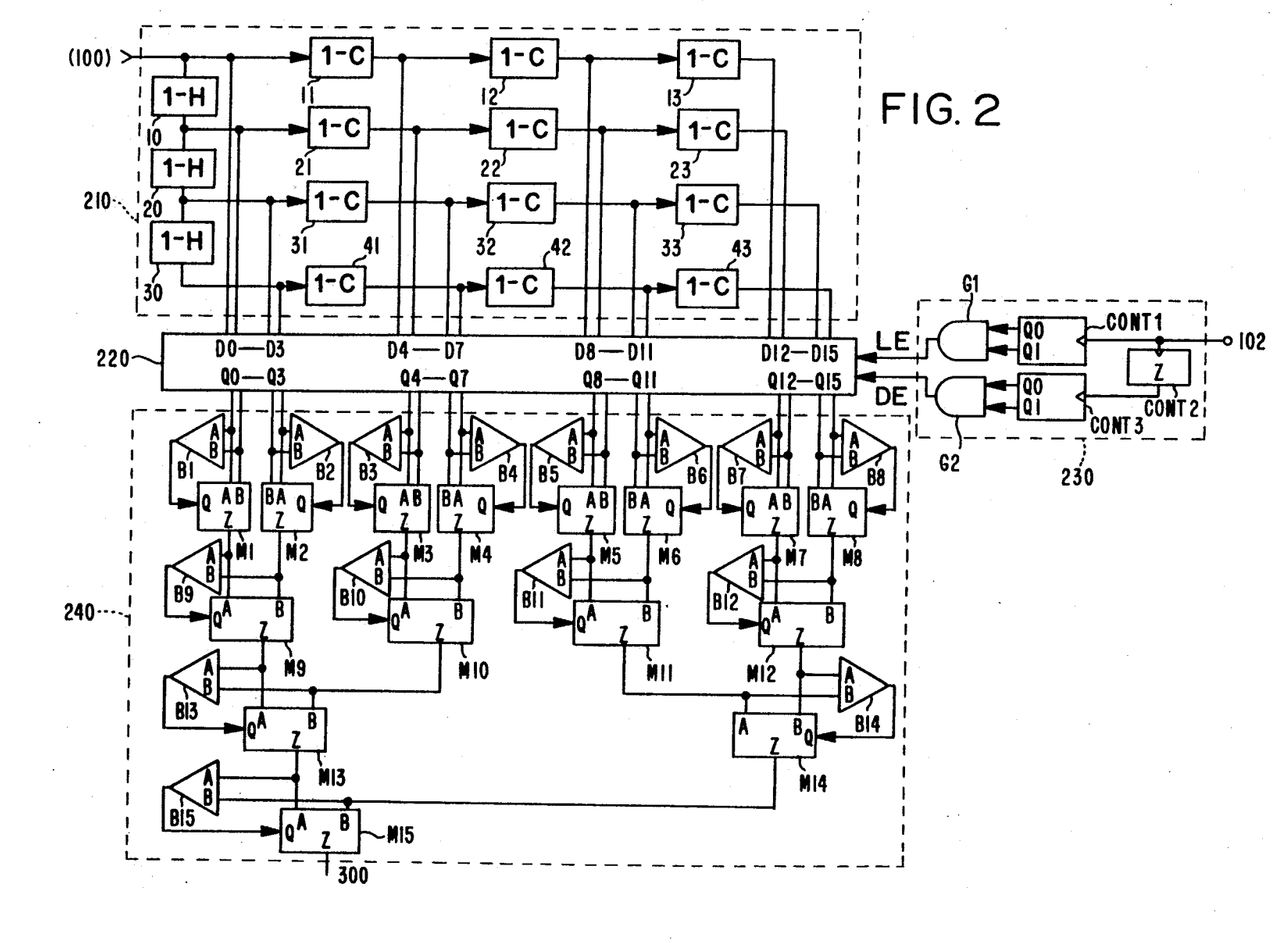
FIG. 2 is a detailed circuit diagram of a maximum value detecting circuit in FIG. 1.

FIG. 2 is a detailed circuit diagram of the maximum value detecting circuit 200 as shown in FIG. 1.

The maximum value detecting circuit 200 is composed of a block extracting circuit 20 which delays the absolute-valued video signal by 1H(H: horizontal scanning period), 2H, and 3H in the vertical direction, and also delays the 1H, 2H, and 3H delayed video signals by 1C (c:clock period), 2C, and 3C in the horizontal direction to provide 4×4 pixel data, a latch 220 which provides the 1st~16th pixel data by a latch enable signal LE, a latch controller 230 which counts the clock pulse to provide a latch enable signal for every four pixels, that is, to provide the latch enable signal LE during one horizontal scanning period, and a maximum value selecting circuit 240 which compares the 1st~16th pixel data and selects the largest value.

The block extractor 210 is connected to the output terminal of the absolute value circuit 100. In the block extractor 210, three 1H delays 10, 20, and 30 delay the video signal by one horizontal scanning period, respectively.

Also, 1C delays 11, 21, 31, and 41 delay the 1H, 2H, and 3H delayed video signals by one clock period in the horizontal direction, respectively. Similarly, the 1C delays 12, 22, 32 and 42 are connected to the 1C delays 11, 21, 31, and 41, to delay the video signal by one clock period, respectively, and the others 13, 23, 33, and 43 are connected as well.

Also, the latch control circuit 230 is composed of a counter CONT1 for counting the clock signal applied through the clock input terminal 102, a line counter CONT2 for providing the pulse every horizontal scanning line period, by counting the clock signal, a counter CONT3 for counting the output of the counter CONT2, and two AND gates G1 and G2, for providing the latch enable signal LE and the output enable signal OE by the logic combination of the outputs of the counters CONT1 and CONT3, respectively.

In the maximum value selecting circuit 240, eight multiplexers M1~M8 are connected to the output terminals Q0~Q15 of the latch 220, and each multiplexer selects and provides one of two inputs, A and B, by the selecting data from a terminal S.

At this time, eight comparators B1~B8 are also connected to the output terminals Q0~Q15 of the latch 220, to provide the selecting data to each multiplexer by comparing each input pair.

Also, four comparators B9~B12 are connected to the eight multiplexers M1~M8 to provide the selecting data to four multiplexers M9~M12 by comparing the inputs A and B provided from the multiplexers M1~M8.

Similarly, two multiplexer, M13 and M14, two comparators, B13 and B14 are connected in common to the output terminals of the four multiplexers M9~M12 and susequently, multiplexer M15 and, comparator B15 are connected to the output terminals of the two multiplexers M13 and M14.

Figure 3:
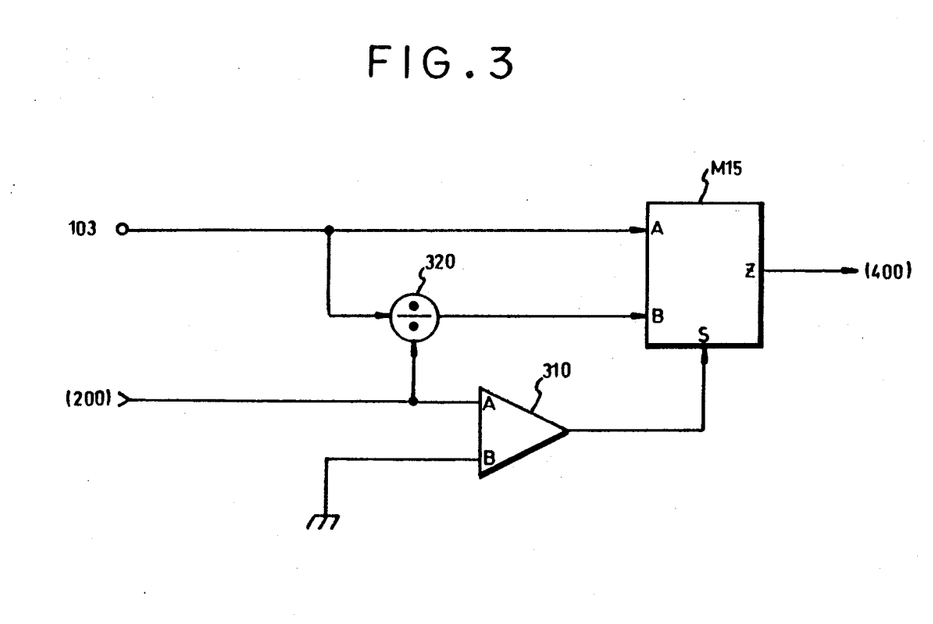
FIG. 3 is a detailed circuit diagram of an block adaptation factor generating circuit in FIG. 1.

FIG. 3 shows a detailed circuit diagram of the block adaptive factor generating circuit 300 shown in FIG. 1. The block adaptive factor generating circuit 300 is composed of a comparator 310, of which one input terminal A is connected to the output terminal of the maximum value detecting circuit 240 and the other terminal B is connected to the ground to compare the maximum value with zero level, a divider 320 for dividing the channel peak value applied through a channel peak input terminal 103 by the maximum value, and a multiplexer 330 for providing one of the maximum value at an input terminal A and the output of the divider 320 at another input terminal B according to the selecting data at the selecting terminal.

Figure 4:
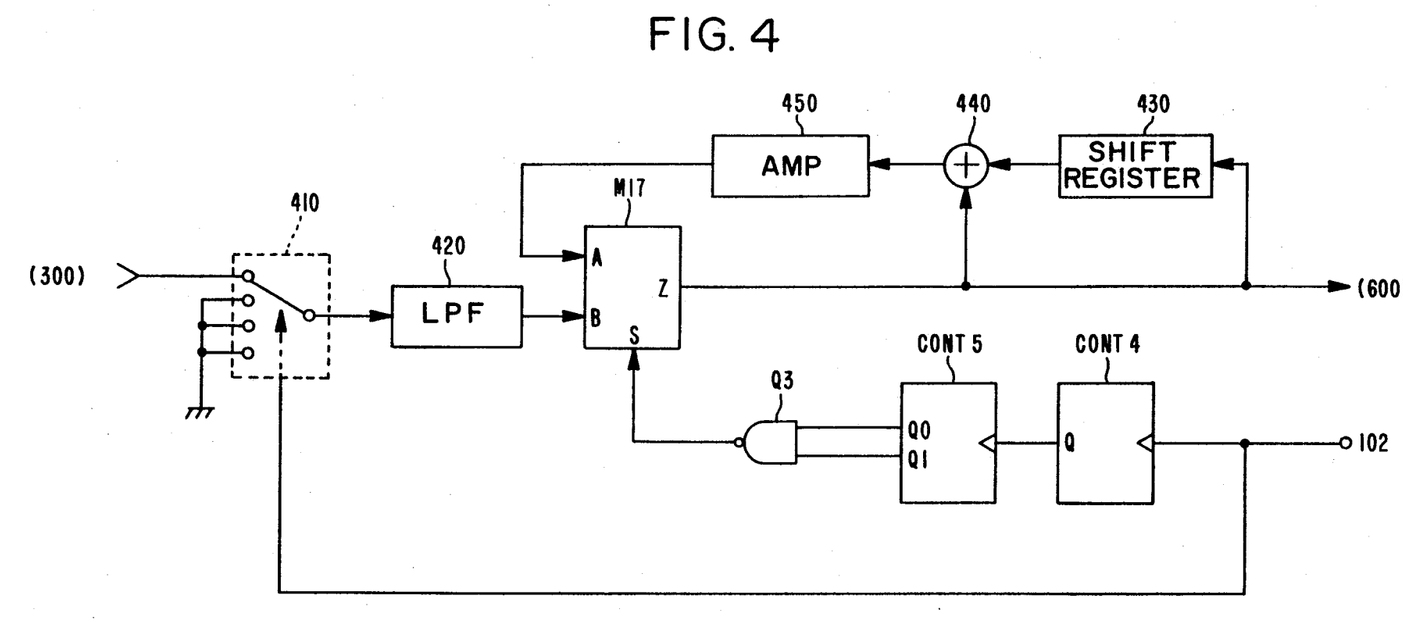
FIG. 4 is a detailed circuit diagram of first and second pixel adaptation factor generating circuits in FIG. 1.

FIG. 4 shows a detailed circuit diagram of the pixel adaptive factor generating circuit 400 and 800 shown in FIG. 1. In FIG. 4, a switch 410 of which one input terminal is connected to the output terminal of the block adaptation factor generating circuit 300 and the others are connected to the ground, is connected to a low pass filter 420.

The switch 410 is sequentially switched by the clock signal applied through the clock input terminal 102 and then provides the block adaptation factor output every four clocks, while providing zero to the low pass filter 420 during the other clocks.

On the other hand, a counter CONT4 which provides the pulse every one horizontal scanning line period by counting the clock signal applied though the clock input terminal 102 is connected to another counter CONT5. Then, the counter CONT5 counts the pulse output of the counter CONT4 and provides the output signals to two input terminals of a NAND gate G3, which provides a selecting data by the logic combination.

Also, a multiplexer M17, of which an input terminal B is connected to the output terminal of the low pass filter 420 and the other input terminal A is connected to a half amplifier 450, provides the pixel adaptation factor signal at the terminal B through an output terminal Z during one horizontal scanning period, while providing the input signal at the terminal A, by the selecting signal at a terminal S. Then, a one-line shift register 430 delays the output of the multiplexer M17 by one horizontal scanning line period.

Next, a multiplier 330 provides the product of the outputs of the multiplexer M17, and both the one-line shift register and a half amplifier 450 amplifies the output of the multiplier 440 by a factor of ½.

Now the operation of the present invention is described in detail, in reference to the timing diagram as shown in FIG. 5.

First, when the power supply is turned on and the video signal is applied to both absolute value circuit 100 and delay compensating circuit 500, the absolute value circuit 100 changes the value of input video signal to its absolute value.

Subsequently, the maximum value detecting circuit 300 extracts a two-dimension block consisting of 4×4 pixels from the absolute-valued video signal by using the 1H delays 10~30 and the 1C delays 11~13, 21~23, 31~33, and 41~42 in, order to provide the 1st~16th pixel data. At this time, the latch 220 and the latch control circuit 230 control each block of 4×4 pixels not to be overlapped.

Figure 5A:
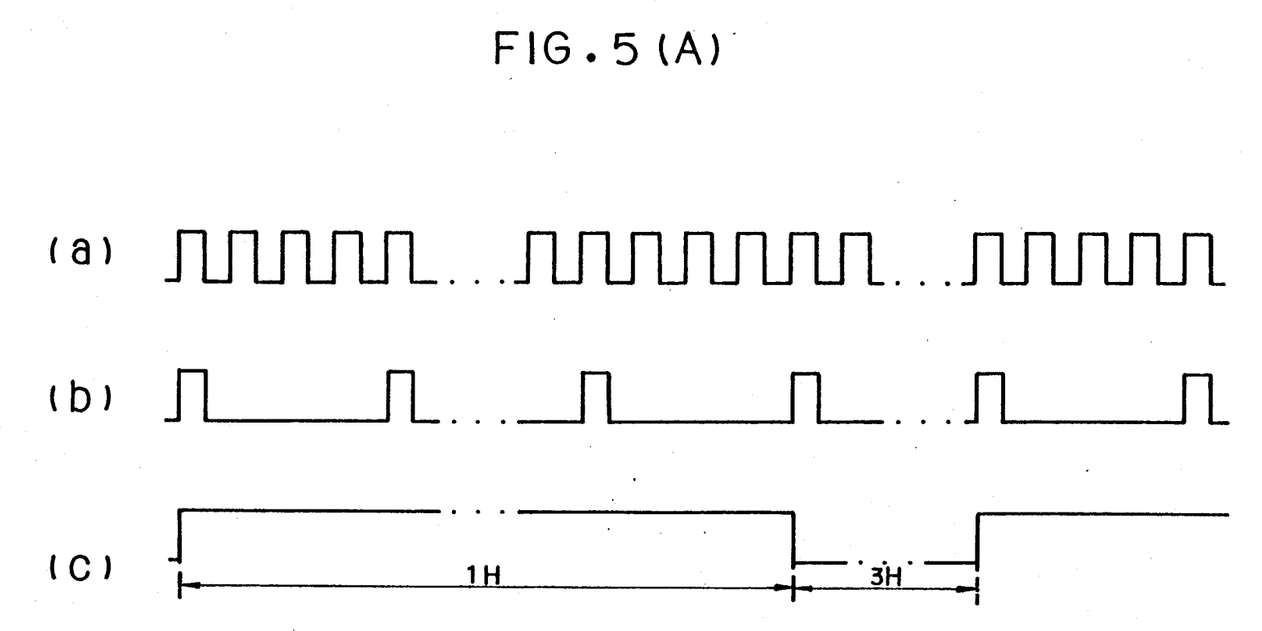
FIG. 5 is the timing diagrams of major parts in FIG. 1.

The counter CONT1 outputs a latch enable signal, as shown in FIG. 5A-(b) every, four pixels to the latch enable terminal of the latch 220, and the counter CONT3 outputs an output enable signal as shown in FIG. 5A-(c) during one of four lines. In the present invention, one block is composed of 4×4 pixels, but the block can be composed differently if necessary.

The latch 220 outputs the 1st~16th pixel data to the maximum value selecting circuit 240. And the maximum value selecting circuit 240 selects the maximum value of the 1st~16th pixel data by using the multiplexers M1~M15 and the comparator B1~B15 to provide it to the block adaptation factor generator 330.

Then, the block adaptive factor generator 300 outputs the channel peak value as the block factor, if the output value of the maximum value detecting circuit is zero, while providing the channel peak value divided by the maximum value if the output value is not zero.

The channel peak value represents the allowable maximum peak value of the transmission channel and is dependent on the number of bits per pixel. For example, if eight bits are used for one pixel data, the channel peak value is 127 (=2⁷−1) since one bit is used as a sign bit.

Next, the block adaptive factor is applied to the pixel adaptation factor generating circuit 400 shown is FIG. 4. Then, the pixel adaptation factor generator 400 generates the pixel adaptive coefficients by interpolation.

Figure 5B:
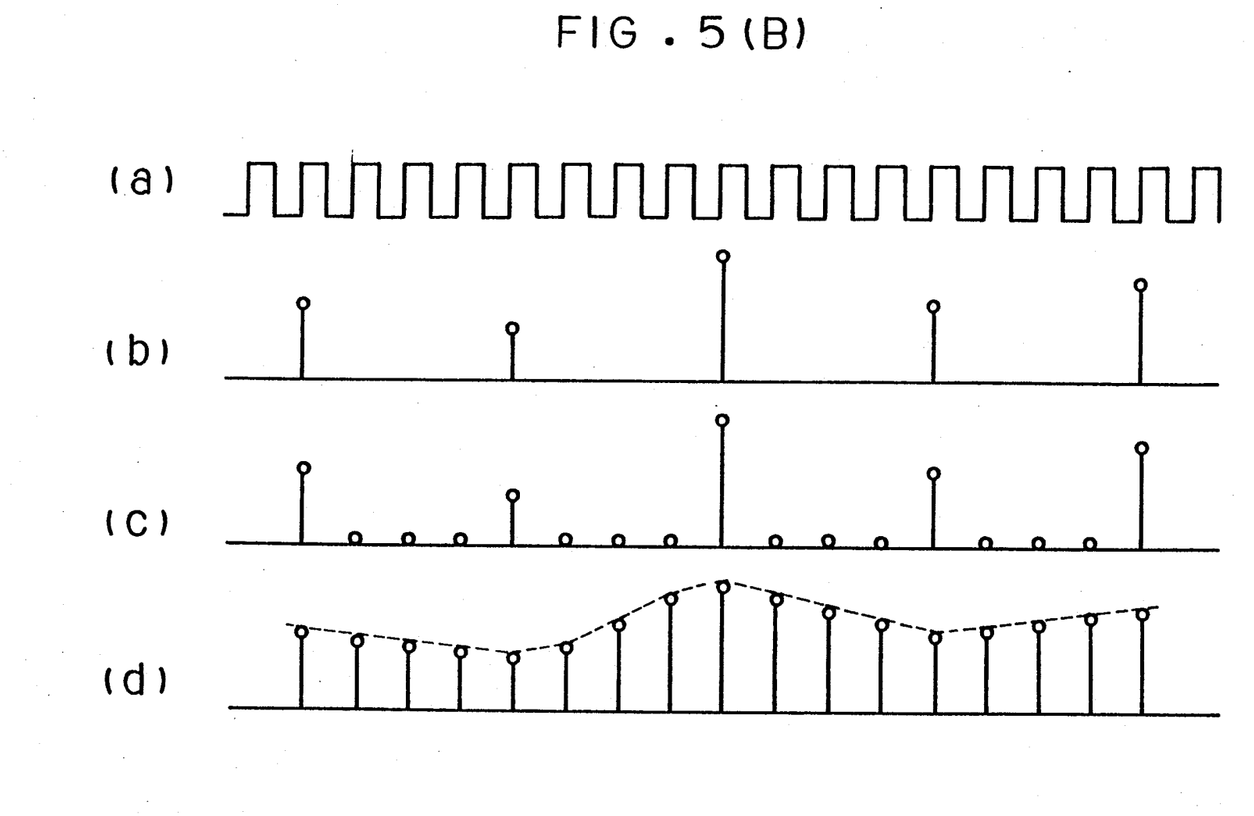

That is, since the block adaptation factor signal is applied only for one line every four horizontal scanning lines, as shown in FIG. 5B-(b), the pixel adaptive factor generator 400 generates the pixel adaptive coefficients for the other three lines by using the line shift register 430 as shown in FIG. 5B-(d).

Thus, the variation between the pixels is not large by the interpolation in the horizontal direction and taking the line average in the vertical direction. Here, FIG. 5B-(a) represents the clock signal and FIG. 5B-(c) represents the output signal of the switch 410 of which operation is controlled by the clock signal.

On the other hand, since some time is delayed until the pixel adaptive coefficients are generated, the delay compensating circuit is used to synchronize the input video signal with the output signal of the pixel adaptive factor generating circuit 400. Thus, the time-compensated pixel signals are multiplied by the pixel adaptive factor signals by the multiplier 600 and are subsequently transmitted through the channel.

Also, when the output of the multiplier 600 is transmitted to the decoder circuit 2000, the block adaptive factor is transmitted together. In the decoder circuit 2000, then, the pixel adaptive factor generating circuit 800 which is the same as that in the encoder circuit 1000 generates the pixel adaptive coefficients again.

Subsequently, the pixel signals are divided by the pixel adaptive coefficients in the divider 900, thereby reconstructing the original pixel signal. At this time, the delay compensating circuit 700 compensates the delayed time for generating the pixel adaptive factor, in the encoder circuit 1000.

As mentioned up to now, the present invention can reduce the noise mixed during the channel transmission by a factor of the factor ratio, by dividing the high frequency components of a video signal into the two-dimension block and by generating the adaptive coefficients according to the maximum value of each block and by multiplying the adaptive coefficients to the pixel signals in the transmitting circuit, and by dividing again the transmitted signal, by the adaptive coefficients again in the receiver circuit.

What is claimed is:

1. A noise reduction circuit for high definition video signals, comprising:
   absolute value generating means for successively generating absolute values of high frequency component video signals;
   maximum value detecting means for successively forming two-dimensional blocks of said absolute values and providing maximum values for each of said two-dimensional blocks;
   block adaptive factor generating means receiving said maximum values and providing a channel peak value as block adaptive factors if said maximum values are zero and providing said channel peak value divided by said maximum values as said block adaptive factors if said maximum values are non-zero;
   first pixel adaptive factor generating means for generating first pixel adaptive factors by interpolating said block adaptive factors in a horizontal direction and by averaging said block adaptive factors between lines in a vertical direction;
   multiplier means for generating transmitting signals by multiplying said high frequency component video signals by said first pixel adaptive factors to amplify a level of video pixel signals for transmission through a channel;
   second pixel adaptive factor generating means for generating second pixel adaptive factors by interpolating said block adaptive factors in the horizontal direction and by averaging said block adaptive factors between lines in the vertical direction; and
   divider means for reconstructing said high-frequency component video signals by dividing the transmitting signals received from said multiplier means through said channel by said second pixel adaptive factors.

2. The noise reduction circuit according to claim 1, wherein said maximum value detecting means comprises:
   a block extracting circuit for forming said two-dimensional blocks of said absolute values by delaying said absolute values one, two and three horizontal scanning line periods and then by one, two and three clock periods in the horizontal direction to thereby form four-by-four blocks of pixel data, a latch for providing the 1st~16th pixel data in response to latch enable signals, a latch circuit for generating said latch enable signals every four pixel periods, and a maximum value selecting means for comparing said 1st~16th pixel data to each other to determine a maximum value for each of said two dimensional blocks.

3. The noise reduction circuit according to claim 2, wherein said block extracting circuit comprises:

a first horizontal scanning line delay connected to said absolute value generating means for delaying said absolute values by one horizontal scanning line period, a second horizontal scanning line delay connected to an output terminal of said first horizontal scanning line delay for delaying the 1H-delayed absolute values by one horizontal scanning line period, a third horizontal scanning line delay connected to the output terminal of said second horizontal scanning line delay for delaying the 2H-delayed absolute values by one horizontal scanning line period, and a plurality of series connected clock delays each connected to different ones of said absolute value means and the horzontal scanning line delays for delaying said absolute values, said 1H-delayed absolute values, said 2H-delayed absolute values and 3H-delayed absolute values by one, two and three horizontal sampling clock periods.

4. The noise reduction circuit according to claim 2, wherein said latch control circuit comprises:

a first counter for counting clock pulses to generate first counter pulses, a second counter for providing second counter pulses every one horizontal scanning line period by counting said clock pulses, a third counter for providing third counter pulses by counting said second counter pulses, and two AND gates each receiving a different one of said first counter pulses and said third counter pulses and providing said latch enable signals and output enable signals, respectively, by logic multiplex of said first counter pulses and said third counter pulses.

5. The noise reduction circuit according to claim 2, wherein said maximum value selecting means comprises:

fifteen multiplexers for selecting and providing input signals according to selecting signals, and fifteen comparators for providing said selecting signals to each of said fifteen multiplexer by comparing respective said input signals.

6. The noise reduction circuit according to claim 1, wherein said block adaptive factor generating means comprises:

a comparator having one input terminal receiving said maximum values and another input terminal receiving a reference potential to compare each maximum value with said reference potential, a divider for dividing said channel peak value by said maximum values, and a multiplexer for selecting and providing the maximum values and an output of said divider as said block adaptive factors.

7. The noise reduction circuit according to claim 1, wherein said first pixel adaptive factor generating means comprises:

a switch having a first input terminal receiving said block adaptive factors and three other input terminals connected to a reference potential, for providing said block adaptive factors every fourth clock pulse while providing said reference potential during the other three clock pulses, a low pass filter for providing a first output by filtering said block adaptive factors provided by said switch, a first counter for providing first pulses every one horizontal scanning line by counting said clock pulses, a second counter for providing second pulses by counting said first pulses of said first counter, an NAND gate for providing selecting data by logic multiplex negation of the second pulses of said second counter, a multiplexer for transmitting said first output as said first adaptive pixel factors for one horizontal scanning line, while transmitting a second output as said first adaptive pixel factors for three horizontal scanning lines according to said selecting data, a shift register for providing a delayed line by delaying said first adaptive pixel factors by one horizontal scanning line delay, a multiplier for multiplying said first adaptive pixel factors by the output of said shift register to generate multiplier signals, and an amplifier for amplifying and providing said multiplier signals as said second output.

8. The noise reduction circuit of claim 1, further comprising a first delay compensating circuit for delaying said high frequency component video signals received by said multiplier means.

9. The noise reduction circuit of claim 8, further comprising a second delay compensating circuit for delaying said transmitted high frequency component video signals received by said divider means to enable synchronization of said transmitted high frequency component video signals with said second pixel adaptive factors.

10. A noise reduction circuit for high definition video signals comprising:

absolute value generating means for successively generating absolute values of high frequency component video signals;

maximum value detecting means for successively forming two-dimensional blocks of said absolute values and providing maximum values for each of said two-dimensional blocks;

block adaptive factor generating means receiving said maximum values and providing a channel peak value as block adaptive factors if said maximum values are zero and providing said channel peak value divided said maximum values as said block adaptive factors if said maximum values are non-zero;

first pixel adaptive factor generating means for generating first pixel adaptive factors by interpolating said block adaptive factors in a horizontal direction and by averaging said block adaptive factors between lines in a vertical direction; and multiplier means for multiplying said high frequency component video signals by said pixel adaptive factors to amplify a level of video pixel signals for transmission through a 11. The noise reduction circuit of claim 10, further comprising:
    second pixel adaptive factor generating means for generating second pixel adaptive factors by interpolating transmitted block adaptive factors in the horizontal direction and by averaging said transmitted block adaptive factors between lines in the vertical direction; and
    divider means for reconstructing high-frequency component video signals by dividing the transmitted high frequency component video signals received through said channel by said second pixel adaptive factors.

12. The noise reduction circuit of claim 10, wherein said maximum value detecting means comprises:
    block extracting means for forming said two-dimensional blocks of said absolute values by delaying said absolute values one, two and three horizontal scanning line periods and then by integer multiple clock periods in the horizontal direction to thereby form four-by-four blocks of pixel data,
    latch means for providing 1st~16th pixel data in response to latch enable signals,
    latch control circuit means for generating said latch enable signals every four pixel periods, and
    a maximum value selecting means for comparing said 1st~16th pixel data to each other to determine a maximum value for each of said two dimensional blocks.

13. The noise reduction circuit of claim 10, wherein said maximum value detecting means comprises:
    block extracting means for forming said two-dimensional blocks of said absolute values by delaying said absolute values one, two and three horizontal scanning line periods and then by integer multiple clock periods in the horizontal direction to thereby form four-by-four blocks of pixel data,
    latch means for providing 1st~16th pixel data in response to latch enable signals,
    latch control circuit means for generating said latch enable signals every four pixels periods, and
    a maximum value selecting means for comparing said 1st~16th pixel data to each other to determine a maximum value for each of said two dimensional blocks.

14. The noise reduction circuit of claim 10, wherein said block adaptive factor generating means comprises:
    a comparator having one input terminal receiving said maximum values and another input terminal receiving a reference potential to compare each of said maximum values with said reference potential,
    a divider for dividing said channel peak value by said maximum values, and
    a multiplexer for selecting and providing said maximum values or an output of said divider as said block adaptive factors.

15. The noise reduction circuit according to claim 12, wherein said block adaptive factor generating means comprises:
    a comparator having one input terminal receiving said maximum values and another input terminal receiving a reference potential to compare each one of said maximum values with said reference potential,
    a divider for dividing said channel peak value by said maximum values, and
    a multiplexer for selecting and providing said maximum values or an output of said divider as said block adaptive factors.

16. The noise reduction circuit according to claim 10, wherein said first pixel adaptive factor generating means comprises:
    a switch having a first input terminal receiving said block adaptive factors and three other input terminals connected to a reference potential, for providing said block adaptive factors every fourth clock pulse while providing said reference potential during the other three clock pulses,
    filter means for providing a first output by filtering said block adaptive factors provided by said switch,
    counter means for providing counter pulses by counting said clock pulses, means for providing selecting data by logic multiplex negation of said counter pulses,
    a multiplexer for providing said first output as said first adaptive pixel factors for every fourth horizontal scanning line, while providing a second output as said first adaptive pixel factors for the three other horizontal scanning lines according to said selecting data,
    a shift register for providing a delayed line by delaying said first adaptive pixel factors by one horizontal scanning line delay, and
    means for multiplying said first adaptive pixel factors by said delayed line to generate said second output.

17. The noise reduction circuit according to claim 12, wherein said first pixel adaptive factor generating means comprises:
    a switch having a first input terminal receiving said block adaptive factors and three other input terminals connected to a reference potential, for providing said block adaptive factors every fourth clock pulse while providing said reference potential during the other three clock pulses,
    filter means for providing a first output by filtering said block adaptive factors provided by said switch,
    counter means for providing counter pulses by counting said clock pulses, means for providing selecting data by logic multiplex negation of said counter pulses,
    a multiplexer for providing said first output as said first adaptive pixel factors for every fourth horizontal scanning line, while providing a second output as said first adaptive pixel factors for the three other horizontal scanning lines according to said selecting data,
    a shift register for providing a delayed line by delaying said first adaptive pixel factors by one horizontal scanning line delay, and
    means for multiplying said first adaptive pixel factors by said delayed line to generate said second output.

18. The noise reduction circuit according to claim 14, wherein said first pixel adaptive factor generating means comprises:
    a switch having a first input terminal receiving said block adaptive factors and three other input terminals connected to a reference potential, for providing said block adaptive factors every fourth clock pulse while providing said reference potential during the other three clock pulses, filter means for providing a first output by filtering said block adaptive factors provided by said switch, counter means for providing counter pulses by counting said clock pulses, means for providing selecting data by logic multiplex negation of said counter pulses, a multiplexer for providing said first output as said first adaptive pixel factors for every fourth horizontal scanning line, while providing a second output as said first adaptive pixel factors for the three other horizontal scanning lines according to said selecting data, a shift register for providing a delayed line by delaying said first adaptive pixel factors by one horizontal scanning line delay, and means for multiplying said first adaptive pixel factors by said delayed line to generate said second output.

19. The noise reduction circuit according to claim 15, wherein said first pixel adaptive factor generating means comprises:

a switch having a first input terminal receiving said block adaptive factors and three other input terminals connected to a reference potential, for providing said block adaptive factors every fourth clock pulse while providing said reference potential during the other three clock pulses, filter means for providing a first output by filtering said block adaptive factors provided by said switch, counter means for providing counter pulses by counting said clock pulses, means for providing selecting data by logic multiplex negation of said counter pulses, a multiplexer for providing said first output as said first adaptive pixel factors for every fourth horizontal scanning line, while providing a second output as said first adaptive pixel factors for the three other horizontal scanning lines according to said selecting data, a shift register for providing a delayed line by delaying said first adaptive pixel factors by one horizontal scanning line delay, and means for multiplying said first adaptive pixel factors by said delayed line to generate said second output.

20. The noise reduction circuit according to claim 12, wherein said block extracting means comprises:

a first horizontal scanning line delay connected to said absolute value means for providing 1H-delayed values by delaying said absolute values by one horizontal scanning line period, a second horizontal scanning line delay for providing 2H-delayed values by delaying said 1H-values by one horizontal scanning line period, a third horizontal scanning line delay for providing 3H-delayed values by delaying the 2H-delayed values by one horizontal scanning line period, a plurality of series connected clock delays each connected to the output of a different one of said absolute value generating means and the first, second and third horizontal scanning line delays, for delaying said absolute values, said 1H-delayed values, said 2H-delayed values and said 3H-delayed values by one, two and three horizontal sampling clock periods.

21. The noise refection circuit according to claim 12, wherein said latch control circuit means comprises:

counter means for counting clock pulses to generate first counter pulses, for providing second counter pulses for every one horizontal scanning line period by counting said clock pulses, and for providing third counter pulses by counting said second counter pulses, and logic gating means for providing said latch enable signals and output enable signals by logic multiplex of said first counter pulses and said third counter pulses.

22. The noise rejection circuit according to claim 12, wherein said maximum value selecting means comprises:

multiplexing means for selecting and providing input signals according to selecting signals, and comparator means for providing said selecting signals by comparing respective said input signals.

23. The noise rejection circuit according to claim 20, wherein said latch control circuit means comprises:

counter means for counting clock pulses to generate first counter pulses, for providing second counter pulses for every one horizontal scanning line period by counting said clock pulses, and for providing third counter pulses by counting said second counter pulses, and logic gating means for providing said latch enable signals and output enable signals by logic multiplex of said first counter pulses and said third counter pulses.

24. The noise rejection circuit according to claim 20, wherein said maximum value selecting means comprises:

multiplexing means for selecting and providing input signals according to selecting signals, and comparator means for providing said selecting signals by comparing respective said input signals.

25. The noise rejection circuit according to claim 21, wherein said maximum value selecting means comprises:

multiplexing means for selecting and providing input signals according to selecting signals, and comparator means for providing said selecting signals by comparing respective said input signals.

26. A noise reduction process, comprising:

successively generating absolute values of high frequency component video signals;

successively forming two-dimensional blocks of said absolute values and providing maximum values for each of said two-dimensional blocks;

providing a channel peak value as block adaptive factors if said maximum values are zero and providing said channel peak value divided said maximum values as said block adaptive factors if said maximum values are non-zero;

generating first pixel adaptive factors by interpolating said block adaptive factors in a horizontal direction and by averaging said block adaptive factors between lines in a vertical direction;

delaying high frequency components of pixels for a predetermined time to synchronize said high frequency components with the timing of the first pixel adaptive factors;

multiplying said high frequency component video signals by said first pixel adaptive factors to amplify a level of video pixel signals for transmission through a channel;

generating second pixel adaptive factors by interpolating said block adaptive factors in the horizontal direction and by averaging said block adaptive factors between lines in the vertical direction; and reconstructing said high frequency component video signals by dividing the high frequency component video signals received through said channel by said second pixel adaptive factors.

27. The noise reduction process according to claim 26, wherein said maximum values are provided by steps comprised of:

forming said two-dimensional blocks of said absolute values by delaying said absolute values one, two and three horizontal scanning line periods and then by one, two and three clock periods in the horizontal direction to thereby form four-by-four blocks of pixel data;

providing 1st–16th pixel data in response to latch enable signals;

generating said latch enable signals every four pixels periods; and;

comparing said 1st–16th pixel data to each other to determine a maximum value for each of said two-dimensional blocks.

* * * * *

UNITED STATES PATENT AND TRADEMARK OFFICE
CERTIFICATE OF CORRECTION

PATENT NO. : 5,210,609
DATED : 11 May, 1993
INVENTOR(S) : Phil-Ho Yu

It is certified that error appears in the above-indentified patent and that said Letters Patent is hereby corrected as shown below:

Column 1   Line 11 delete "the";

Column 2   Line 23 change "to" to --with--, and change "and" to --to--;

Column 2   Line 42 change semicolon to colon --:--;

Column 4   Line 19 after "M14," insert --and--:

Signed and Sealed this

Fourth Day of March, 1997

Attest:

BRUCE LEHMAN

Attesting Officer

Commissioner of Patents and Trademarks